May 18, 1965  S. A. SCHERBATSKOY  3,184,597
STABILIZED SCINTILLATION DETECTOR
Original Filed Sept. 23, 1958  3 Sheets-Sheet 2

Serge A. Scherbatskoy
INVENTOR.

BY Dours, McDougall
& Hersh
Attorneys

May 18, 1965 S. A. SCHERBATSKOY 3,184,597
STABILIZED SCINTILLATION DETECTOR
Original Filed Sept. 23, 1958 3 Sheets-Sheet 3

INVENTOR.
Serge A. Scherbatskoy
BY Dows, McDougall
+ Hersh
Attorneys 3,184,597
STABILIZED SCINTILLATION DETECTOR
Serge A. Scherbatskoy, 804 Wright Bldg., Tulsa 3, Okla.
Original applications Sept. 23, 1958, Ser. No. 762,890, and Aug. 17, 1959, Ser. No. 834,182, now Patent No. 3,089,955, dated May 14, 1963. Divided and this application Aug. 23, 1962, Ser. No. 218,992
11 Claims. (Cl. 250—71.5)

This invention relates broadly to detection and/or measurement of radiation; in particular, it is concerned with instruments of the type using photomultipliers, and it involves means for insuring, in such instruments, a high degree of stability and calibration accuracy.

The present specification is a division of my earlier copending applications Serial No. 762,890, filed September 23, 1958, now abandoned, and No. 834,182, filed August 17, 1959, now U.S. Patent No. 3,089,955, part of the disclosure herein having first appeared in the earlier of said copending applications and the remainder having first appeared in the other.

As is well known, the detecting element of a scintillation-type radiation detector comprises a "phosphor" of a suitably chosen material such as enthracene, cadmium tungstate, sodium iodide, cesium iodide, or lithium iodide, that will scintillate—i.e., give off light flashes—in response to interactions with incoming radiation quanta such as gamma-ray photons, neutrons, or other nuclear rays. It is a characteristic of such phosphors that the light flashes generated therein are proportional in intensity to the energies dissipated in the phosphor by the respective nuclear rays which interact therewith.

The light flashes produced in the phosphor in response to radiation impinging thereon are arranged to illuminate the photocathode of a photomultiplier tube which, in turn, generates electric pulses respectively corresponding in magnitude to the intensities of the light flashes. Such electric pulses, by means well known to the art, may be analyzed according to their magnitudes and frequency of occurrence; and information thereby obtained as to the energy spectrum and intensity of the radiation field to which the phosphor is exposed.

In scintillation detectors of the type under consideration, the photomultiplier tube is a prime source of instability. It is an extremely sensitive device, the characteristics of which tend to change with time, temperature, exposure to radiation, changes in supply voltage, and other factors.

It is a major object of my invention to provide, in measuring instruments utilizing a photomultiplier, novel and effective means for stabilizing automatically the over-all sensitivity of the system and hence rendering the calibration of the instrument substantially unaffected by fortuitous changes in photomultiplier characteristics.

In furtherance of this major object, it is a specific object of my invention to provide, in such instruments, a control arrangement for automatically adjusting the voltage supply of the photomultiplier tube to compensate for any departure from normal operating condition or change in photomultiplier characteristics that might otherwise throw off the accuracy of the instrument's readings.

Other objects and advantages of the invention will be apparent from the following detailed description of two specific embodiments of my invention.

In the appended drawing, FIGURE 1 illustrates, diagrammatically and schematically, an embodiment of my invention wherein stabilization of detector operation is accomplished with the aid of a system for generating reference light flashes that are readily distinguishable from the flashes generated in the phosphor by radiation quanta.

Figure 1:
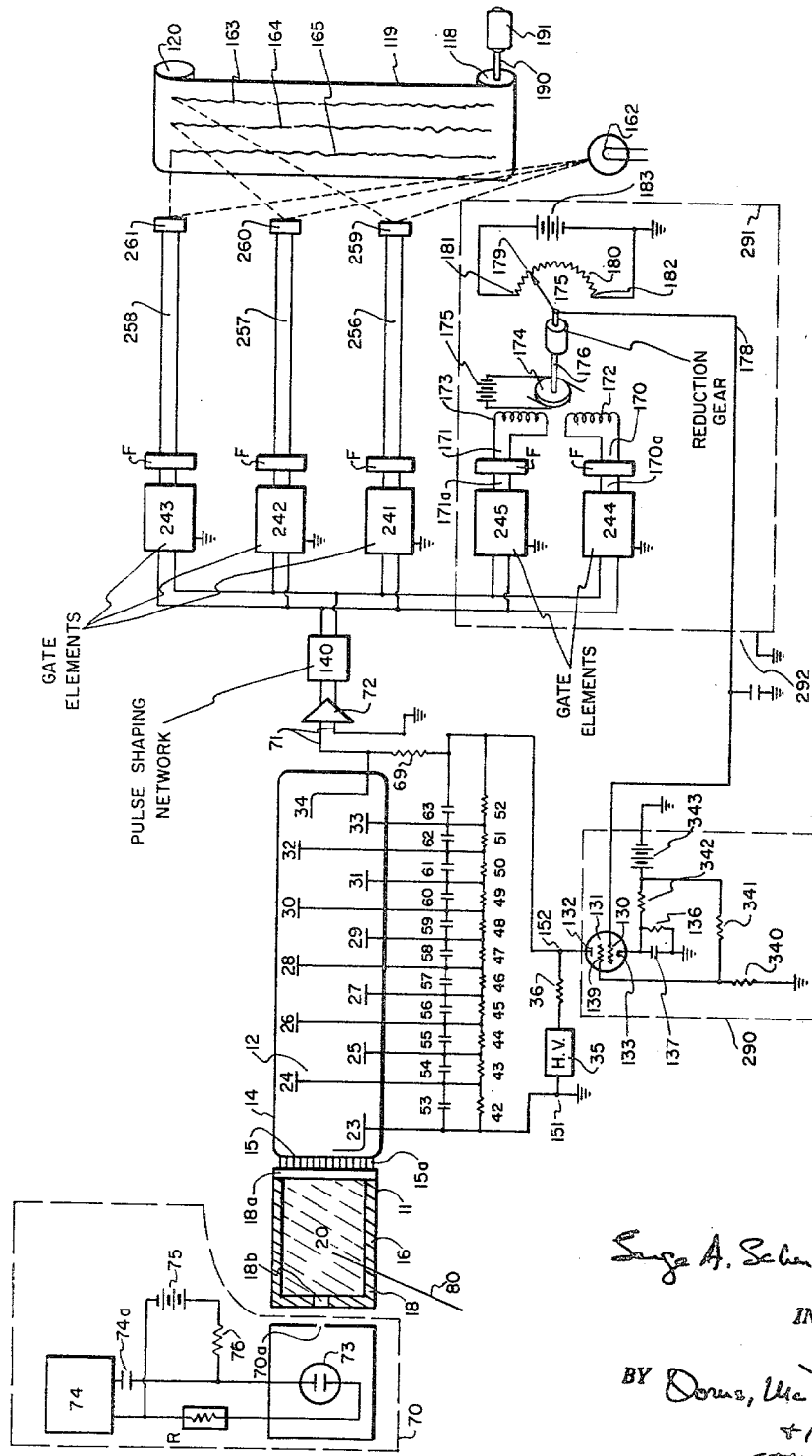
FIGS. 1a and 1b illustrate certain pulse shapes produced in the apparatus of FIG. 1.

Referring now to FIG. 1, I show therein a radiation-detecting arrangement of the scintillation type comprising a phosphor 20 included within housing 11, a photomultiplier 12, a source 70 of reference light pulses, an amplitude-selective network for spectral analysis of detected radiation, comprising three gate elements 241, 242, and 243, and various associated apparatus presently to be described.

The photomultiplier 12 is of a standard construction within a cylindrical enclosure 14 provided with a transparent wall 15. The wall 15 is of a thin optical glass and is optically coupled to the phosphor member by means of a suitable substance such as silicone grease or Canada balsam 15a. The phosphor housing is placed adjacent the photomultiplier and has its inner walls coated with a light-diffusing substance 16. The phosphor member forms a unitary structure with outside walls 18 and two light-transparent glass windows 18a and 18b at each end, the windows being preferably of ultraviolet transparent glass such as Vicor. The phosphor element contained within the housing 11 consists of a suitable crystal 20, said crystal being, for example, anthracene, cadmium tungstate, sodium iodide, or lithium iodide.

The photomultiplier is provided with a photosensitive cathode 23 and a plurality of dynodes 24–33 and anode 34, each at a higher potential than the potential of the preceding one. The dynode potentials are drived from a voltage-dividing circuit consisting of a high voltage supply 35 in series with a resistor 36 and a plurality of resistor elements 42–52, said resistor elements being individually shunted by condensers 53–63, respectively. The voltage applied across the resistors 42–52 is approximately 1100 volts. Consequently, the voltage applied across each of said resistors is approximately 100 volts. The voltage across the resistor 42 is applied between the photocathode 23 and dynode 24, the voltage across the resistor 43 is applied across the dynodes 24, 25 and the voltages across the resistors 44, 45, 46, 47, 48, 49, 50, 51 are applied across the dynodes 25–26, 26–27, 27–28, 28–29, 29–30, 30–31, 31–32, 32–33, respectively. The voltage derived from the resistor 52 is applied across the electrodes 33–34 in series with the resistor 69. The leads 71 connect the photomultiplier output to the input of amplifier 72, and the output terminals of the amplifier are in turn connected to the pulse-shaping network 140. For a description of a pulse-shaping network see J. W. Coltman and Fitz-Hugh Marshall, Nuclenoics, 1, 1947, p. 58.

Figure 1A:
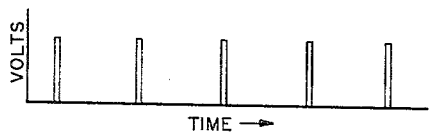
Figure 1B:
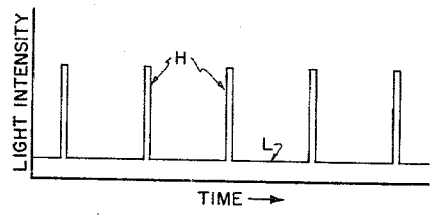

The function of the element generally desingated by the numeral 70 is to periodically emit and to direct toward the photocathode 23 reference light pulses of uniform light intensity. More specifically, the system 70 comprises an argon light tube 73 having its terminals connected to a suitable source of pulsating current such as a multivibrator oscillator 74. Light tubes such as 73 are well known and, for example, are manufactured by the General Electric Company. It is desirable that the light flashes from the tube 73 be of very short duration. For this purpose it has been found convenient to keep the light tube 73 constantly ignited at a very low luminosity level by means of battery 75 and resistor 76 and to superpose on the weak current generated by said battery and resistor an additional voltage from a multivibrator 74 connected to the tube 73 through condenser 74a. The multivibrator 74 is of well-known standard construction such as the General Radio Co. unit-pulser model Type 1217A, and is designed to generate an output voltage having a wave shape substantially as shown in FIG. 1a, i.e., a series of narrow pulses suitably spaced. The frequency of these pulses for the embodiment under discussion is preferably of the order of 20 pulses per second, and the width of the pulses is preferably of the order of 1 microsecond. The behavior of the entire element 70 is such as to put out light flashes substantially as shown in FIG. 1b, the lower constant illumination L being derived from the battery 75 and the resistor 76, and the high intensity flashes H being derived from the voltage generated by the multivibrator 74. By provding a suitable diaphragm or pin hole 70a the level of illumination L of FIG. 1b can be made entirely negligible, whereas the short flashes H are of substantial intensity and impinge on the photocathode 23. The amplitude of the pulses generated by the multivibrator 74 is substantially constant and the frequency of oscillation is relatively low, of the order of 20 pulses per second.

The phosphor 20 and the photomultiplier 12, with its associated power supply, comprise a scintillation detector which operates in the following manner: Let numeral 80 designate a beam of incoming particles such as gamma-ray photons. The beam 80 is not monochromatic, i.e., it contains photons of various energy values. It is one of the purposes of this invention to investigate and to determine the energy spectrum of this incident beam 80, i.e., to investigate and to determine the composition of the beam. This can be expressed by the measurement of the relative rate of occurrence of photons comprised within several predetermined energy ranges. It is apparent that photons compirsed in the beam 80 penetrate into the crystal 20 and interact with its electrons. As is well known, an electron is ejected as a result of such interaction, said electron losing its energy by exciting and ionizing the molecules in said crystal in the immediate neighborhood of the point of interaction. These molecules radiate energy in the form of light in all directions. These rays of light become reflected by the surface 16, then transmitted through the transparent walls 18a and 15 and the intervening material 15a to the photomultiplier 12 wherein they impinge upon the photocathode 23, thus forming a single pulse of photoelectrons. It is well known by those skilled in the art that the magnitude of said pulse of photoelectrons is uniquely related to the energy of the photon in the beam 80 that interacts with the crystal 20. When the incident photon has a relatively large energy then the corresponding electron resulting from the interaction with the crystal 20 also has a large energy and the pulse of photoelectrons formed at the photocathode 23 is relatively large.

It is thus apparent that we have in the beam 80 a succession of photons of various energies that interact with the crystal 20 and, as a result of this interaction, we obtain at the photocathode 23 a succession of single pulses, each of said pulses having magnitude that is uniquely related to the energy of the corresponding photon in the beam 80.

From the foregoing it will be seen that the photocathode 23 is illuminated by light impulses derived from two different sources—first, the flashes due to interaction with the phosphor 20 of incident nuclear radiation, as represented by the beam 80, and, second, light pulses of controlled magnitude, duration, and frequency, derived from the periodically energized argon tube 73. The reference light pulses emitted by tube 73 are preferably arranged to be of greater intensity than the flashes resulting from nuclear interactions within the phosphor 20.

Both sets of light flashes impinging upon the photocathode 23 result in the production of corresponding electric pulses at the output of photomultiplier 12, by virtue of the familiar secondary-emission action of the photomultiplier tube. In this process, each light flash impinging on photocathode 23 results in the emission therefrom of one or more photoelectrons. Each photoelectron is swept to the first dynode by a potential difference of about a hundred volts and ejects four or five secondary electrons. These in turn are swept to the second dynode and similarly multiplied by the secondary emission amplification. After nine such stages, an avalanche of a million electrons, more or less, appears at the output of the photomultiplier tubes as a result of each initial photoelectron. We obtain then, across the output terminals 71, a succession of current pulses. Some of these pulses of uniform and relatively large magnitude and occurring at equal intervals are due to the reference light flashes emitted by the tube 73. Other pulses of relatively smaller magnitudes that usually differ one from another are caused by the interaction of incident nuclear radiation (of the beam 80) with the phosphor 20.

Figure 2:
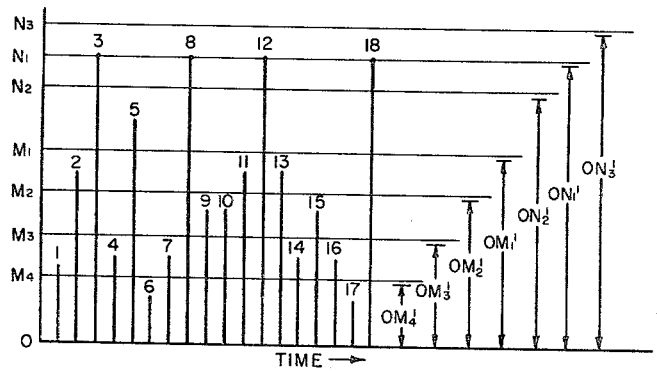
FIG. 2 illustrates diagrammatically a succession of electric current impulses derived from the photomultiplier in my invention.
Figure 4:
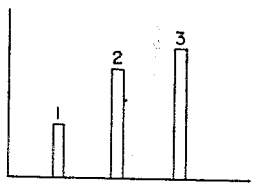
FIG. 4 shows diagrammatically the output of a pulse shaping network utilized in my invention.

All the above pulses are subsequently amplified in the amplifier 72, said amplifier being connected to the pulse-shaping network 140 which is designed to provide for each pulse a corresponding output voltage pulse that will have a somewhat longer duration (and preferably a rectangular shape) and a variable height as shown in FIG. 4, said height representing the magnitude of the impulse. The output of said pulse-shaping network therefore consists of a succession of discrete pulses, the magnitude of each pulse serving to identify the energies of individual photons or quanta comprised in the beam 80 and the intensity of the reference pulses emitted by the tube 73. FIG. 2 gives a diagrammatical representation of such an output in which the abscissas represents the time of occurrence of the pulses and the ordinates represent the respective magnitudes of the pulses. The pulses have been designated by consecutive numerals such as 1, 2, 3, etc. These pulses have been subdivided into four energy groups which are designated by Roman numerals I, II, III, and IV.

Group I comprises pulses smaller than a predetermined valve $OM_1$ and larger than a predetermined value $OM_2$. In FIG. 2 pulses belonging to this group are designated as 2, 11, and 13.

Group II comprises pulses smaller than a predetermined value $OM_2$ and larger than a predetermined value $OM_3$. In FIG. 2 the pulses belonging to this group are designated as 9, 10, and 15.

Group III comprises pulses smaller then a predetermined value $OM_3$ and larger than a predetermined value $OM_4$. In FIG. 2 the pulses belonging to this group are designated as 1, 4, 7, 14, and 16.

Group IV comprises pulses having all substantially a predetermined value $ON_1$. These pulses represent the intensity of the light flashes produced by the reference source 73. We have assumed that the light flashes produced by the source 73 occur at substantially equal intervals. In FIG. 2 the pulses belonging to this group are designated as 3, 8, 12, and 18. As shown in this figure, these pulses appear recurrently at substantially equal intervals.

The output pulses shown in FIG. 2 are simultaneously applied to five gate elements, respectively numbered 241, 242, 243, 244, and 245. Each of these gate elements is characterized by two threshold values—i.e., it is arranged to transmit only those impulses the magnitude of which is below the upper threshold and above the lower threshold. Thus, gate 241 may be arranged to transmit pulses of magnitudes between the values $OM_1$ and $OM_2$; gate 242 may be arranged to transmit only pulses having magnitudes between the values $OM_2$ and $OM_3$, and so on.

The gate 244 is adapted to transmit impulses having magnitude $ON_2$, somewhat smaller than $ON_1$, but cannot transmit impulses having magnitude $ON_1$. Correspondingly, the gate 245 is adapted to transmit impulses having the magnitude $ON_3$ but cannot transmit impulses of value $ON_1$.

The output terminals of the gates 241, 242, and 243 are connected to conventional frequency meters F whose respective outputs are connected through leads 256, 257, and 258 respectively to galvanometer coils 259, 260, and 261. The galvanometer coils have attached thereto suitable mirrors, adapted to reflect beams of light derived from source 162. These reflected beams impinge on sensitive film 119 which is progressively advanced from the spool 120 onto the spool 118, in a manner well known to the art.

The apparatus just described is per se conventional and constitutes a recording oscillograph operative to produce traces 163, 164, and 165 representing as functions of time the corresponding variations of the rate of incidence of nuclear rays corresponding in energy levels to the electric pulse outputs of gate elements 241, 242, and 243 respectively.

Gate elements of the type represented by elements 241–245 are per se conventional. For the sake of completeness, however, I have shown in FIG. 3 a schematic diagram of a typical gate element suitable for use in this connection, it being provided with input terminals 221 and output terminals 235.

The essential element of the gate consists of a pulse-height selector comprising two individual channels designated as A and B. The pulse-height selector channel is arranged to give across its output terminals a voltage pulse only when the input pulse applied to terminals 221 is contained within a predetermined range of magnitudes constituting the transmission band.

The channel A comprises input terminals 221, resistor 254, and triode 256, whose cathode 257 is connected to ground in series with biasing battery 258. Plate 260 of triode 256 is connected to the output terminal 232 and to anode load resistor 261, which in turn is connected to the positive terminal of battery 262, the negative terminal of which is grounded.

The channel B comprises input terminals 221, resistor 267, and triode 269, whose cathode 270 is connected to ground through biasing battery 271. Plate 272 of triode 269 is connected to output terminal 266 and thence through anode load resistor 274 to the positive terminal of battery 262.

In reference now to channel A, it is apparent that output pulses will appear between terminals 232 and 253 only in response to input pulses that are capable of overcoming the biasing voltage supplied to triode 256 by battery 258. Similarly, in the channel B, output pulses appear between terminals 266 and 253 only in response to input pulses that are capable of overcoming the biasing voltage suppiled to triode 269 by battery 271.

The two output voltages across the terminals 232, 253 and 266, 253 are in opposition, so that the resultant output between the terminals 232 and 266 is equal to their difference.

Assume now that a train of electric pulses is applied to input terminals 221, and consider the following three cases designated as (a), (b), and (c).

Case (a): The impulse applied to the terminals 221 has a value below the threshold voltages of the tubes 256 and 269. Consequently, no plate currents will be delivered by these tubes and no voltage will appear across the terminals 232, 266.

Case (b): The impulse applied to the terminals 221 has a value above the threshold voltages of the tubes 256 and 269. Consequently, both tubes deliver plate currents, and two short voltage impulses appear substantially simultaneously across the output terminals 232, 253 and 266, 253. Since these two voltages are substantially equal, the resultant voltage across the terminals 232, 266 is substantially zero.

Case (c): The pulse applied to the terminals 221 has a value smaller than the threshold of the tube 269, but larger than the threshold of the tube 256. Consequently, a plate current will pass through the tube 256 and no plate current will pass through the tube 269. Consequently, no voltage will be produced across the terminals 266, 253 and a short voltage impulse will appear across the terminals 232, 253. We obtain, therefore, across the terminals 266, 232 a voltage pulse.

From the foregoing analysis it will be plain that the range of pulse magnitudes constituting the transmission band are those lying between the limiting values defined by the respective thresholds of triodes 256 and 269.

The output impulses appearing across the terminals 232, 266 are applied to a transformer 291, the secondary winding of which feeds output leads 235.

Figure 3:
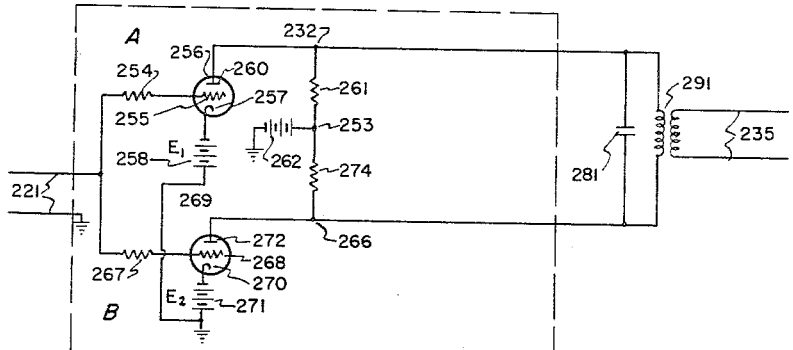
FIG. 3 is a schematic showing of an illustrative electric circuit usable in my invention as a "gate element."

As previously noted, pulse-height selectors of the type broadly represented by the apparatus of FIG. 3 are per se well known, and any suitable conventional pulse-height selector circuit may be used for the gate elements of my invention in lieu of the FIG. 3 apparatus.

I shall now describe the portion of the FIG. 1 embodiment of my invention by means of which stable operation and accurate calibration of the radiation detector is achieved notwithstanding unpredictable and uncontrollable changes in the sensitivity and operating characteristics of the photomultiplier 12. Broadly speaking, this portion of my invention comprises a voltage-regulating apparatus shown within the dashed rectangle 290 and a control apparatus therefor shown within the dashed rectangle 291.

As previously explained, the thresholds of the gate elements 244 and 245 are so adjusted as to lie respectively just above and just below the pulse magnitude represented by pulse height $ON_1$. Hence, when the sensitivity of the photomultiplier 12 is at its standard or reference value, no output pulses are obtained on either output leads 170a, fed by gate element 244, or 171a, fed by gate element 245.

Assume now that the sensitivity of the photomultiplier undergoes a change; for example, it decreases. Consequently, the voltage pulses across the output terminals 71 that are originated by the argon tube decrease in size and when they have decreased to the neighborhood of the magnitude $ON_2$, they pass through the gate 244 and produce suitable voltage across the output terminals 170a of said gate. Assume that, conversely, the sensitivity of the photomultiplier increases. Consequently, the impulses originated by the argon tube increase in size and when they reach the magnitude $ON_3$ they pass through the gate 245 and produce a suitable voltage across the output terminals 171a.

It is thus apparent that when the sensitivity of the photomultiplier decreases we obtain a voltage across the terminals 170, and, when the sensitivity increases, we obtain a voltage across the terminals 171. Electric pulses derived from these output terminals 170a and 171a are respectively integrated by the frequency meters F and resulting D.-C. outputs thereof are respectively applied to the excitation windings 172 and 173 of a D.-C. motor 174, said motor receiving its armature current from a battery 175. The windings 172 and 173 are wound to produce respectively opposing magnetic fluxes, so that their respective energizations cause the motor to turn in opposite directions. The motor 174 is adapted to displace angularly a rotatable conductive member 175 by means of a shaft 176. When the excitation winding 170 is energized by the voltage output from the gate 244, the member 175 effects an angular displacement in counterclockwise direction. When, however, the excitation winding 173 is energized by the voltage output from the gate 245, the member 175 effects an angular displacement in clockwise direction. One terminal 177 of the member 175 at the point of rotation is connected to a lead 178 and the other terminal 179 is slidingly engaged on a fixed semicircular resistor 180, said resistor having its two terminals 181, 182 connected to a battery 183. It is apparent that when the sensitivity of the photomultiplier decreases, a control voltage appears across the output terminals 170 of the gate 244 in the manner hereinabove described. Said control voltage causes the rotation of the shaft 175 in a counterclockwise direction. As the shaft 175 rotates, the control voltages applied to the terminals 292 increase in magnitude, and the amplification of the photomultiplier is made to increase by action of the device 290 (as will be explained later). Consequently, the reference impulses caused by the argon tube 73 cannot pass any longer through the gate 244. Thus the voltage across the terminals 170 drops to zero and consequently the member 175 stops rotating and reaches a stationary position corresponding to an increase in the control voltages to the terminals 292 by a definite amount.

It is further apparent that the voltage between the grounded terminal 182 and the lead 178 decreases when the member 175 rotates clockwise and increases when it rotates anticlockwise. The lead 178 is connected to one of the output leads 292 of the control means 291. It is thus seen that I have provided across the output leads 292 a voltage representing the departure of the sensitivity of the photomultiplier 12 from its normal value.

The voltage produced across the output leads 292 is applied between ground and the control grid 130 of tube 131, within the voltage-regulating apparatus generally designated 290. The tube 131 has its plate 132 connected to the resistor 36, the resistor 36 being in series with the high voltage supply 35, said elements being comprised in a system for supplying the operating potentials to the photomultiplier 12.

The cathode 133 of the tube 131 is connected to ground by means of a resistance-condenser element consisting of a resistance 136 shunted by the condenser 137.

It is apparent that the tube 131 constitutes a shunt applied to the resistor 36 in series with the high voltage supply 35 and that the equivalent impedance of the shunt may be appropriately varied by means of the voltage applied to the grid 130.

The tube 131 is provided with a screen grid 139 which is connected to ground through resistor 340, the other terminal of said resistor being connected through resistor 341 to the battery 343. The circuit of tube 131 is energized by a battery 343 having its negative terminal grounded and the positive terminal connected to the junction of resistors 341 and 342.

The operation of the above arrangement is as follows:

The photomultiplier is energized by the high voltage supply 35. This high voltage supply is chosen to have a somewhat higher voltage than will be required for the operation of the photomultipler. Under normal operating conditions, there is a small current flowing from the supply 35 through a circuit consisting of the resistor 36 in series with the variable resistance of tube 131 and the resistance 136. This current causes a voltage drop across the resistor 36. The actual operating voltage applied to the photomultiplier consists of the difference of potential between the terminals 151 and 152 and is equal to the voltage of the battery 35 decreased by the potential drop across the resistor 36.

It is apparent that by varying the potential applied to the grid 130 of the tube 131 the equivalent resistance of the tube varies. This in turn causes variation in the current through the resistor 36 and consequently the variation of the operating voltage derived from the terminals 151, 152. Consequently, by varying the grid voltage of the tube 131 we effect a corresponding variation in the operating voltage of the photomultipler.

Under normal operating conditions the voltage applied to the grid 130 of the tube 131 maintains the resistance of the tube at a certain determined value. The corresponding current delivered by the supply 35 and passing through the resistor 36 is such that the voltage across the terminals 151, 152 maintain the sensitivity of the photomultiplier 12 at a normal and predetermined value.

Assume now that because of some extraneous influence beyond our control the sensitivity of the photomultiplier increases. This causes a corresponding increase in the voltage applied to the grid 130 of the tube 131 and a decrease in the equivalent resistance of the tube and a consequent decrease in the voltage applied to the photomultiplier electrodes. This lowering of the voltage lowers the effective amplification of the photomultiplier and tends to countereffect the variation in sensitivity and thus the sensitivity of the photomultiplier is automatically maintained at a substantially constant value. Should the sensitivity of the photomultiplier decrease because of some uncontrollable extraneous effect, the converse takes place and again the amplification is restored. Thus, apparently if the sensitivity of the photomultiplier becomes too large (or conversely too small) the circuit automatically readjusts itself and decreases (or conversely increases) the voltage supplied until it has a lower (or conversely higher) value and countereffects the increase (or conversely decrease) of the said sensitivity.

As the result of this automatic readjustment of the photomultiplier biasing voltage, the magnitude of output impulse resulting from a nuclear interaction in the phosphor 20 of a given energy level is held substantially constant, despite drifts and other changes in the inherent characteristics of photomultiplier 12, with the result that the calibration of the instrument remains accurate.

Variations and refinements in the disclosed apparatus may be made within the spirit of my invention. For example, it may be desirable to interpose the non-linear resistor R in the circuit between multivibrator 74 and argon tube 73, for the purpose of stabilizing the current through tube 73 and thus stabilizing the intensity of the light flashes therefrom. The non-linear resistor R may be made of thyrite or copper oxide, or it can be a backward-connected silicon diode, as is well known.

Figure 5:
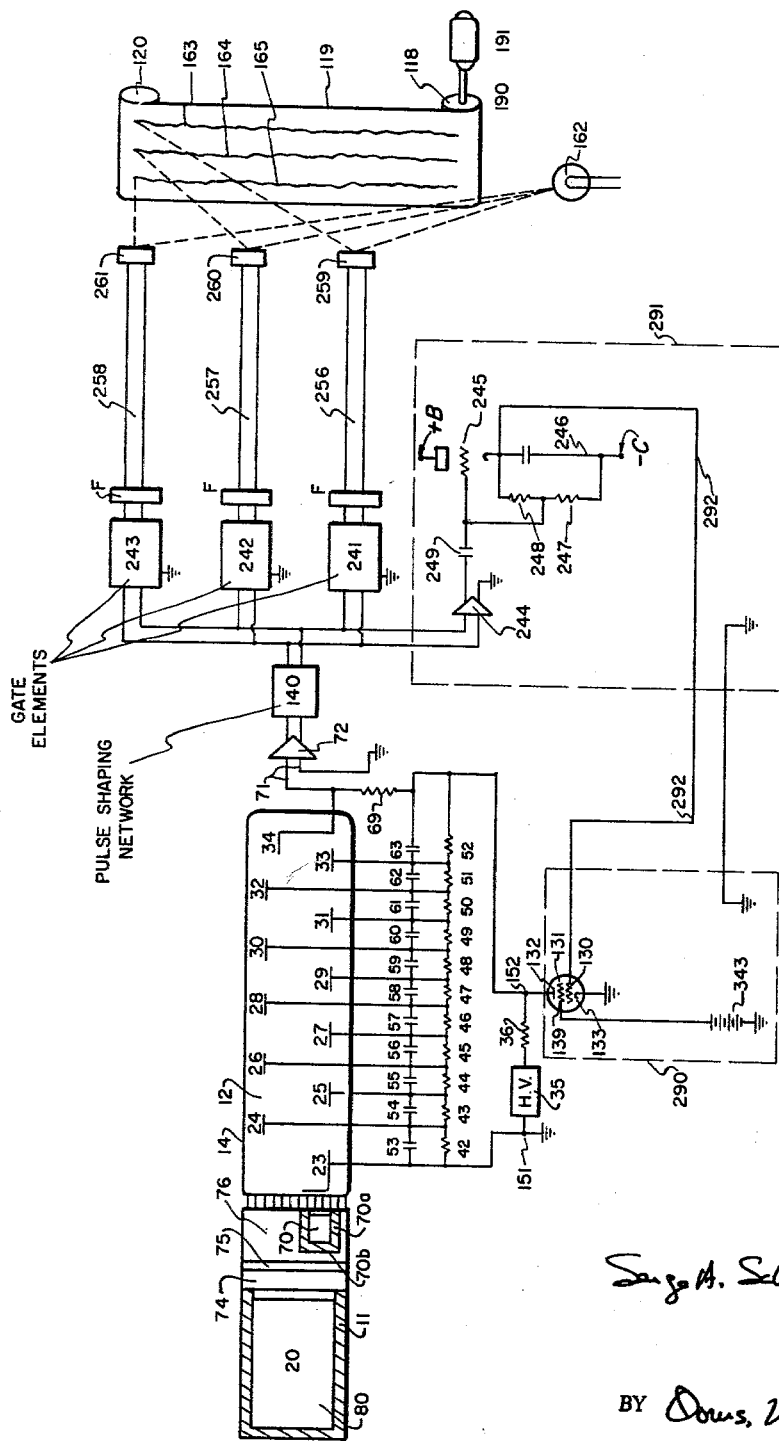
FIG. 5 illustrates, diagrammatically and schematically, another embodiment of my invention in which stabilization of detector sensitivity is accomplished with the aid of apparatus including an auxiliary phosphor and a pilot radiation source.

In FIG. 5 I have shown an alternative embodiment of my invention, employing a different source of pilot flashes and a somewhat different arrangement for controlling the photomultiplier supply voltage for stabilization purposes.

The photomultiplier 12 shown in FIG. 5 and the accompanying voltage-divider network and high-voltage supply 35 may be the same as shown in FIG. 1. The same is true of the output amplifier 72, the pulse-shaping network 140, the pulse-height selectors (i.e., gate elements) 241–243, and the apparatus used in connection therewith for developing an oscillographic record of the relative frequency of occurrence of nuclear interactions in various energy ranges. For that reason, all those elements are shown in FIG. 5 with the same reference numerals as are applied to corresponding elements in FIG. 1, and the foregoing detailed description thereof will not be repeated.

In the FIG. 5 embodiment, I employ an arrangement comprising two phosphors, one of which is used to develop light flashes corresponding to nuclear interactions therewithin from unknown rays impinging on it, and the other of which is used to generate reference light flashes. Both these phosphors may be of the well-known type comprising thallium-activated sodium-iodide crystals, or other suitable phosphor materials of known character may be used.

Phosphor 20, of relatively large size, is contained within the housing 11 and functions as the "main" phosphor— i.e., the sensing element of the instrument, exposed to the incident unknown radiation of which detection and analysis is desired. As a result of interactions with such radiation, light flashes are produced within the crystal 20, and these flashes in turn act upon the photomultiplier 12, whereby the photomultiplier generates current pulses having magnitudes representing the energy of the radiation particles and/or quanta absorbed in the sodium iodide crystal 20.

The other crystal 70 cooperating with the photomultiplier 12 is of relatively small size and contains a radioelement in the melt, as a result of which it is made to interact continually with the rays emitted by this radioelement; for example, the 5.1 mev. alpha particles emitted by plutonium. As a result of this interaction the auxiliary crystal continually emits pulses of light of substantially constant magnitude, the magnitude of each of said pulses having definite relation to the energy of the particles emitted. The auxiliary crystal is used in this arrangement as a source of reference light flashes and its purpose is to stabilize the performance of the measuring system. On the other hand, the main crystal is used as a sensing element and its purpose is to detect the incident radiation to be measured and to produce flashes indicating the character of such radiation.

Crystal 70 is provided with a reflecting surface 70a on all sides except the one exposed to the photomultiplier and also is provided with a light shield 70b. The purpose of the light shield is to prevent any light from the pilot crystal from going backwards and getting reflected by reflector 11. This light shield is made sufficiently thick so as also to prevent any undesired nuclear radiation from the crystal 70 from reaching the crystal 20.

Photomultiplier 12 is continually exposed to light flashes derived from the auxiliary crystal 70 and also those derived from the main crystal 20. The light flashes derived from the auxiliary crystal represent alpha particles having energy 5.1 mev., and those derived from the main crystal represent the energies of various incident particles interacting with it.

The light flashes derived from the main crystal 20 may have the same magnitude or may differ only little in magnitude from the pilot flashes derived from the auxiliary crystal 70. I prevent confusion between these two classes of flashes by providing a light attenuator 75 interposed between the main crystal 20 and the photomultiplier 12, whereby the flashes of light derived from the main crystal are attenuated by a suitable factor, such as one-half. The auxiliary crystal 70 is placed close to the photomultiplier 12 without any light attenuator interposed therebetween, so that the reference light flashes derived from the auxiliary crystal 70 are not attenuated. In this manner, it is assured that the photoelectric effects produced on the photocathode 23 of photomultiplier 12 as the result of the reference flashes in auxiliary crystal 70 will always be of substantially greater intensity than those derived from flashes in the main crystal 20.

As shown in FIG. 5 the optical attenuator interposed between the main crystal 20 and the photomultiplier 12 consists of plastic light pipe 74, a light attenuator 75 adjacent the light pipe 74, and another light pipe 76 placed between the light attenuator 75 and the transparent wall 15 of the photomultiplier. The small auxiliary crystal 70 is imbedded in the light pipe 76 and has one of its surfaces adjacent the wall 15.

The light attenuator 75 is in the form of a plate made of a suitable substance having limited transparency such as Teflon. Various light attenuators of this and other types are manufactured by Eastman Kodak Company.

By the means just described, I provide on the photocathode 23 of photomultiplier 12 two clearly distinguishable classes of light flashes, one representing unknown radiation and the other, of uniform magnitude, representing reference pulses corresponding in function to the light flashes produced by argon tube 73 of the FIG. 1 embodiment.

I shall now describe the means by which, in this FIG. 5 embodiment of my invention, I achieve stable operation and maintain accurate calibration despite unpredictable and uncontrollable changes in the characteristics of photomultiplier 12.

In this embodiment, I dispense with the gate elements 244 and 245 of the FIG. 1 apparatus and instead feed the output pulses from network 140 to the apparatus shown in the dashed rectangle 291. This apparatus includes an amplifier 244, whose input is fed by the pulses from network 140, the output of which is connected through coupling capacitor 249 to the grid of triode 245. This tube and the circuitry associated with it has the function of producing a D.-C. output voltage between lead 292 and ground which varies proportionately to the magnitude of the pilot pulses derived from network 140 but does not vary to any significant degree with changes in their frequency. Since the duration of the pulses from network 140 is only about 1 microsecond, it is necessary, to produce the desired D.-C. voltage, that the condenser 246 be charged from an extremely low-resistance source. Tube 245 is cathode-coupled to the condenser 246 in such a manner as to provide such a low-resistance charging source. It is desirable that tube 245 have very high cathode emission capabilities and very high mutual conductance. A tube such as the type 6J4, or two or even four such tubes in parallel, may be used for the tube 245. In the circuit shown, the source impedance of the condenser-charging pulses is still further reduced by feeding back to the grid of tube 245 a portion of the D.-C. voltage developed in the cathode circuit, as shown in FIG. 5.

In a typical application, condenser 246 might have a value of 1 mfd., resistor 248 may be 4 megohms, and resistor 247 6 megohms. Suitable negative potential at the point marked —C is provided so that tube 131, presently to be described, is biased closed to cut-off.

Broadly speaking, the circuit contained in block 291 is a very efficient peak-voltage responsive device, the D.-C. voltage between output terminal 292 and ground varying substantially in direct proportion to the peak value of the voltage pulses supplied to the grid of tube 245 even though the repetition rate of such pulses be very low.

Assume now that the sensitivity of the photomultiplier undergoes a change; for example, it decreases. Consequently, the voltage pulses across the output terminals 71 that are originated by the auxiliary crystal decrease in size and when they decrease to the neighborhood of the magnitude $ON_2$, the rectifying action of tube 245 becomes less effective and the D.-C. voltage present on lead 292 becomes smaller.

Assume that, conversely, the sensitivity of the photomultiplier increases. Consequently, the impulses originated by the crystal 70 tend to increase in size and when they approach the magnitude $ON_3$ the rectifying action of tube 245 becomes more effective and the D.-C. voltage at lead 292 increases.

It is thus apparent that when the sensitivity of the photomultiplier decreases a D.-C. voltage appears on the terminal 292 that is relatively smaller and, when the sensitivity increases, a voltage is obtained at terminal 292 that is relatively larger.

Terminal 292 is connected to the grid 130 of a tube 131 within the dotted rectangle 290. The tube 131 has its plate 132 connected to the resistor 36, the resistor 36 being in series with the high voltage supply 35, said elements being comprised in a system for supplying the operating potentials to the photomultiplier 12, being similar to the elements designated by the same numerals in FIG. 1.

The cathode 133 of the tube 131 is connected to ground and the screen 139 to a suitable source of potential such as battery 343.

It is apparent that the tube 131 constitutes a shunt applied to the resistor 36 in series with the high voltage supply 35 and that the equivalent resistance of the shunt will change when the voltage applied to the grid 130 changes.

The operation of the system just described is as follows:

The photomultiplier is energized by the high voltage supply 35. This high voltage supply is chosen to have a somewhat higher voltage than will be required for the operation of the photomultiplier. Under normal operating conditions, there is a small current flowing from the supply 35 through a circuit consisting of the resistor 36 in series with the variable resistance of tube 131. This current causes a voltage drop across the resistor 36. The actual operating voltage applied to the photomultiplier consists of the difference of potential between the terminals 151 and 152 and is equal to the voltage of the supply 35 decreased by the potential drop across the resistor 36.

Under normal operating conditions the voltage applied to the grid 130 of the tube 131 maintains the resistance of the tube at a certain determined value. The corresponding current delivered by the supply 35 and passing through the resistor 36 is such that the voltage across the terminals 151, 152 maintains the sensitivity of the photomultiplier 12 at a normal and predetermined value.

Assume now that because of some extraneous influence such as a temperature change, the sensitivity of the photomultiplier increases. This causes a corresponding increase in the voltage applied to the grid 130 of the tube 131 and a decrease in the equivalent resistance of the tube and a consequent decrease in the voltage applied to the photomultiplier electrodes. This lowering of the voltage lowers the effective amplification of the photomultiplier and tends to countereffect the variation in sensitivity and thus the sensitivity of the photomultiplier is automatically maintained at a substantially constant value. Should the sensitivity of the photomultiplier decrease because of some uncontrollable extraneous effect, the converse takes place and again the amplification is restored to its normal predetermined value.

Since the control apparatus of the FIG. 5 embodiment holds the sensitivity of the photomultiplier 12 at the desired predetermined level, the gate networks 241, 242, and 243 will always correctly classify the radiation detected by crystal 20 into the desired energy groups.

While I have described my invention in connection with certain specific embodiments thereof, it is to be understood that this is by way of illustration and not by way of limitation, and I do not mean to be bound thereby, but only to the scope of the appended claims.

I claim:

1. In a scintillation detector for detecting incoming radiation comprising quanta, a substance adapted to interact with said quanta and to produce characteristic light pulses as a result of such interaction, said characteristic light pulses having intensities respectively representing the energies of said quanta, a standard electric light source, means for feeding to said source electric energy in current pulses of predetermined magnitude and controlled repetition rate, producing thereby standard light pulses of uniform brightness exceeding that of said characteristic light pulses, a photoelectric system responsive to said characteristic light pulses and to said standard light pulses for producing current impulses having magnitudes representing the respective magnitudes of said characteristic light pulses and producing other current impulses representing the magnitudes of said standard light pulses, a controllable supply of voltage for energizing at least a part of said photoelectric system, and means responsive to changes in the magnitude of said other current impulses for controlling said voltage supply to maintain said system in calibration despite changes in sensitivity of said photoelectric system.

2. In a scintillation detector for detecting incoming radiation quanta comprising a substance adapted to interact with said radiation and to produce characteristic light pulses as a result of such interaction, said characteristic light pulses having intensities representing the character of said quanta, the combination comprising a standard electric light source, means for feeding electrical energy thereto in pulses of predetermined magnitude and controlled repetition rate, producing thereby standard light pulses of uniform brightness exceeding that of said characteristic light pulses, a photoelectric system responsive to said characteristic light pulses and to said standard light pulses for producing current impulses having magnitudes representative of the intensity of said characteristic light pulses and producing other current impulses having magnitudes representative of the intensity of said standard light pulses, whereby said other current impulses have a predetermined uniform magnitude under predetermined operating conditions, a first selective channel in said system for detecting any of said other impulses that are slightly greater in magnitude than said predetermined magnitude, a second selective channel in said system for detecting any of said other impulses that are slightly smaller in magnitude than said predetermined magnitude, a controllable supply of voltage, and a control system operative responsively to the outputs of said first and second channels for decreasing the output voltage of said supply responsively to the output of said first channel and for increasing the voltage output of said supply responsively to the output of said second channel, changes in the voltage output of said supply being operative to shift correspondingly the response of said system to said characteristic light pulses.

3. In a radiation detecting system, a first scintillation phosphor adapted to receive incident radiation and to produce first flashes of light in response thereto, a second scintillation phosphor and a standard radiation source mounted cooperatively therewith whereby said second scintillation phosphor emits standard light flashes in response to the radiation emitted by said standard source, a photoelectric system adapted to receive said first flashes and said standard flashes and to produce first electric impulses having magnitudes representing the respective intensities of said first flashes and second electrical impulses having magnitures representing the intensities of said standard flashes, an optical attenuating system positioned between said first scintillation phosphor and said photoelectric system for selectively attenuating said first light flashes while traversing said system, whereby said first electrical impulses have magnitudes smaller than said second electrical impulses, a controllable supply of voltage for energizing at least a part of said photoelectric system, and means selectively responsive to changes in magnitude of said second electrical impulses to control said voltage supply to maintain substantially uniform the sensitivity of said photoelectric system.

4. In a radiation detecting system, a scintillation phosphor adapted to receive incident radiation and to produce first flashes of light in response thereto, a source of standard light flashes, positioned near said scintillation phosphor, a photoelectric system positioned and adapted to receive said first flashes and said standard flashes and to produce first electric impulses having magnitudes representing the respective intensities of said first flashes and second electrical impulses having magnitudes representing the intensities of said standard flashes, said photoelectric system comprising a controllable voltage supply for energizing at least a part thereof, an optical attenuating system positioned between said scintillation phosphor and said photoelectric system for selectively attenuating said first light flashes as they pass therebetween, whereby said first electrical impulses have magnitudes smaller than said second electrical impulses, and means selectively responsive to changes in magnitude of said second electrical impulses for controlling said voltage supply to maintain substantially uniform the sensitivity of said photoelectric system.

5. In a radiation detector for measuring incident radiation, of the type having a photomultiplier provided with a photocathode and a phosphor for producing scintillations in response to said radiation and illuminating said photocathode with said scintillations, said photomultiplier being adapted to amplify the initial photoelectric current resulting from the interaction of said scintillations with said photocathode and thus to produce an output signal current representing in amplified form the initial photoelectric current, the combination comprising a pilot radiation source for irradiating said photocathode with reference radiation and thereby producing in the output of said photomultiplier a reference current having a characteristic which makes it distinguishable from said signal current, means utilizing said characteristic for separating said reference current from said signal current, and means operatively connected to said separating means for controlling the amplification of said photomultiplier in response to said reference current.

6. In a radiation detector for measuring incident radiation, a photomultiplier provided with a photocathode, a phosphor for producing scintillations in response to said radiation and thereby illuminating said photocathode, said photomultiplier being adapted to amplify the initial photoelectric current resulting from the interaction of said scintillations with said photocathode and thus produce a signal current representing in amplified form the initial photoelectric current, control means for varying the amplification of said photomultiplier, a pilot radiation source for irradiating said photocathode with reference radiation and causing it to produce a reference current having a characteristic which makes it distinguishable from said signal current, means utilizing said characteristic for separating said reference current from said signal current and means responsive to said reference current and operatively associated with said control means for controlling the amplification of said photomultiplier.

7. In a radiation detector comprising a scintillating phosphor and a photomultiplier having a photocathode adapted to generate an electric current responsively to light impinging thereon and an amplifying means comprising a plurality of secondary-emission electrodes and an anode, said amplifying means being adapted to amplify proportionately said electric current, said phosphor producing scintillations illuminating said photocathode in response to interactions with nuclear rays impinging on said phosphor from its environment, the combination which comprises a light source arranged to further illuminate said photocathode with a standard illumination, said scintillations producing a first photomultiplier electric current and said standard illumination producing a second photomultiplier electric current having a characteristic rendering it distinguishable from said first current, means utilizing said characteristic to separate said first current from said second current, a first electric signal channel for transmitting said first current, a second electric signal channel for transmitting said second current, and means fed by said second electric signal channel and operatively associated with said amplifying means for adjusting the current-amplification characteristic of said photomultiplier responsively to magnitude changes in said second current, to render the sensitivity of said photomultiplier substantially constant.

8. In a radiation detector for measuring incident radiation, a phosphor adapted to produce scintillations in response to said radiation, a photomultiplier provided with a photocathode and a plurality of electrodes, said scintillations being adapted to illuminate said photocathode and to produce in the output of said photomultiplier a first electric current, a voltage supply for establisihng a potential difference between at least two of said electrodes, the magnitude of said potential difference determining the amplification characteristics of said photomultiplier, a standard radiation source arranged to irradiate said photocathode with a standard radiation while said measurement is taking place, thereby producing in the output of said photomultiplier a reference current having a characteristic which makes it distinguishable from said first current, means utilizing said characteristic for separating said reference current from said first current, an electric channel fed by said photomultiplier for transmitting said reference current, and means operatively associated with said channel and said voltage supply for adjusting the magnitude of said potential difference to maintain substantially constant the amplification characteristics of said photomultiplier.

9. In a radiation detector comprising a scintillating phosphor and a photomultiplier provided with a photocathode and a plurality of electrodes, a voltage supply for establishing potential differences between said electrodes, said phosphor being operative to produce scintillations in response to interactions with nuclear radiation from the environment of said phosphor, and said photomultiplier being operative to produce a first electric current in response to said scintillations, a light source arranged to illuminate said photocathode with a standard illumination while such measurement is taking place, and said illumination producing a second photomultiplier electric current having a characteristic that makes it distinguishable from said first current, means utilizing said characteristic to separate said first current from said second current, a first electric signal channel fed by said photomultiplier for transmitting said first current, a second electric signal channel fed by said photomultiplier for transmitting said second current, and means operatively associated with said second electric signal channel and said voltage supply for adjusting the magnitude of at least one of said potential differences responsively to magnitude changes in said second electric current, to maintain substantially constant the over-all amplification of said photomultiplier.

10. In a radiation detector comprising a scintillating phosphor and a photomultiplier provided with a photocathode and a plurality of electrodes, a voltage supply for establishing potential differences between said electrodes, said phosphor being adapted to produce scintillations in response to interactions with nuclear rays from the environment of said phosphor and said detector being adapted to measure the intensity of said rays, a light source ararnged to illuminate said photocathode with a standard illumination while such measurement is taking place, said scintillations producing a first photomultiplier electric current and said illumination producing a second photomultiplier electric current having a characteristic that makes it distinguishable from said first current, means utilizing said characteristic to separate said first current from said second current, a first electric signal channel fed by said photomultiplier for transmitting variations in said first current, a second electric signal channel fed by said photomultiplier for transmitting said second current, and means operatively associated with said second electric signal channel and said voltage supply for increasing at least one of said potential differences when said second electric current decreases in magnitude and decreasing at least one of said potential differences when said second electric current increases in magnitude, whereby the over-all amplification of said photomultiplier is held substantially constant.

11. In a radiation detector comprising a scintillating phosphor and a photomultiplier provided with a photocathode and a plurality of electrodes, a voltage supply for establishing potential differences between said electrodes, said phosphor being adapted to produce scintillations in response to interactions with nuclear rays from the environment of said phosphor and said detector being adapted to measure the intensity of said rays, a light source arranged to illuminate said photocathode with a standard illumination while such measurement is taking place, said scintillations producing a first photomultiplier electric current and said illumination producing a second photomultiplier electric current having a characteristic that makes it distinguishable from said first current, means utilizing said characteristic to separate said first current from said second current, a first electric signal channel fed by said photomultiplier for transmitting said first current, a second electric signal channel fed by said photomultiplier for transmitting said second current, and means operatively associated with said second electric signal channel and said voltage supply for adjusting at least one of said potential differences responsively to magnitude changes in said second current, operative to maintain the sensitivity of said radiation detector substantially constant.

References Cited by the Examiner
UNITED STATES PATENTS

| | | | |
|---|---|---|---|
| 2,412,423 | 12/46 | Rajchman et al. | 250—207 |
| 2,648,012 | 8/53 | Scherbatskoy | 250—71.5 |
| 2,957,988 | 10/60 | Fearnside | 250—71.5 |
| 3,056,885 | 10/62 | Scherbatskoy | 250—71.5 |
| 3,089,955 | 5/63 | Scherbatskoy | 250—71.5 |

RALPH G. NILSON, *Primary Examiner.*

ARCHIE R. BORCHELT, *Examiner.*